3 Sheets—Sheet 1.

E. A. COLES.
Soft Cake Machine.

No. 210,839. Patented Dec. 17, 1878.

Witnesses
Harry King
William Blackstock

Inventor
Erskine A. Coles
By Lysander Hill
His Atty

E. A. COLES.
Soft Cake Machine.
No. 210,839. Patented Dec. 17, 1878.
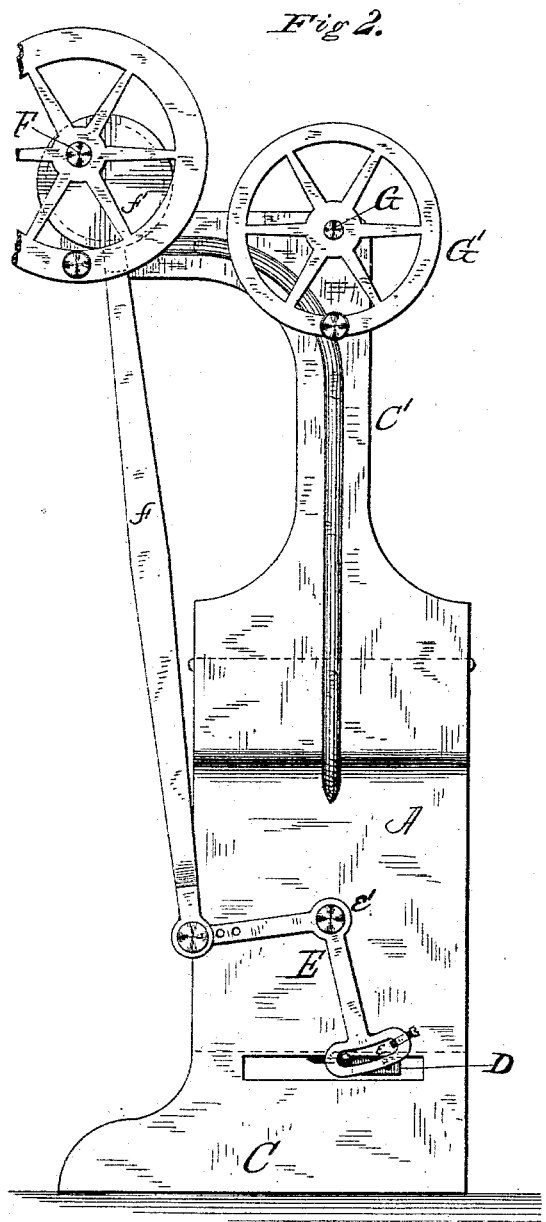
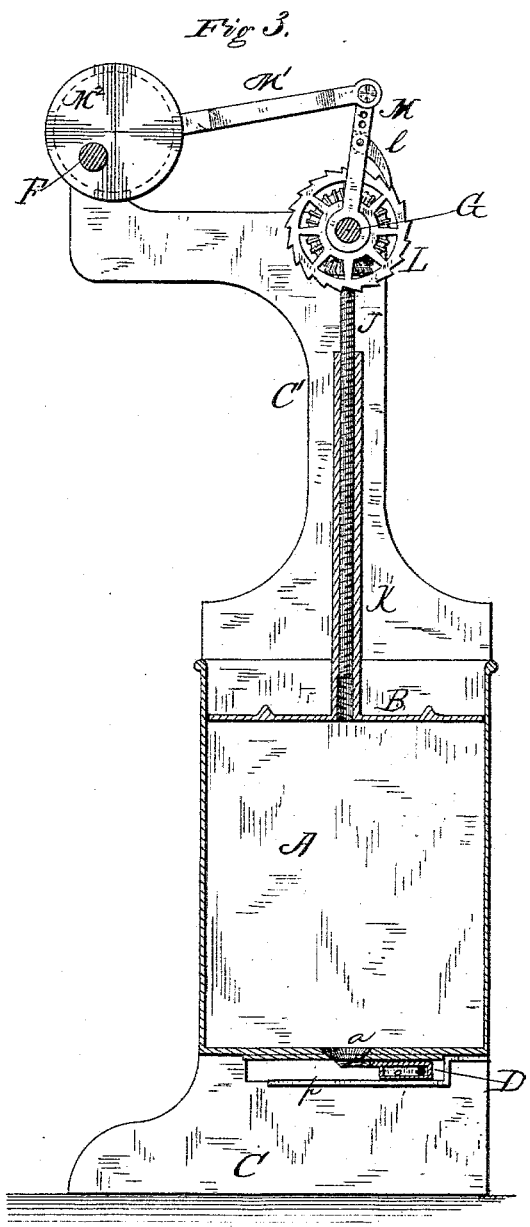
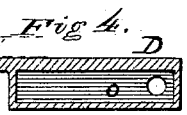

3 Sheets—Sheet 3

E. A. COLES.
Soft Cake Machine.

No. 210,839.      Patented Dec. 17, 1878.

Valve Cutter.

Witnesses.
Harry King
William Blackstock

Inventor.
Erskine A. Coles
By Lysander Hill
His Atty.

N. PETERS, PHOTO-LITHOGRAPHER, WASHINGTON, D. C.

UNITED STATES PATENT OFFICE.

ERSKINE A. COLES, OF PHILADELPHIA, PA., ASSIGNOR TO GEORGE R. HILL AND GEORGE H. SMITH, OF ALEXANDRIA, VA., ONE-THIRD TO EACH.

IMPROVEMENT IN SOFT-CAKE MACHINES.

Specification forming part of Letters Patent No. 210,839, dated December 17, 1878; application filed September 27, 1878.

*To all whom it may concern:*

Be it known that I, ERSKINE A. COLES, of Philadelphia, in the county of Philadelphia and State of Pennsylvania, have invented a certain new and Improved Soft-Cake, Cracker, or Biscuit Machine; and I do hereby declare the following to be a full, clear, and exact description of the same, reference being had to the accompanying drawings, forming part of this specification, in which—

Figure 1:
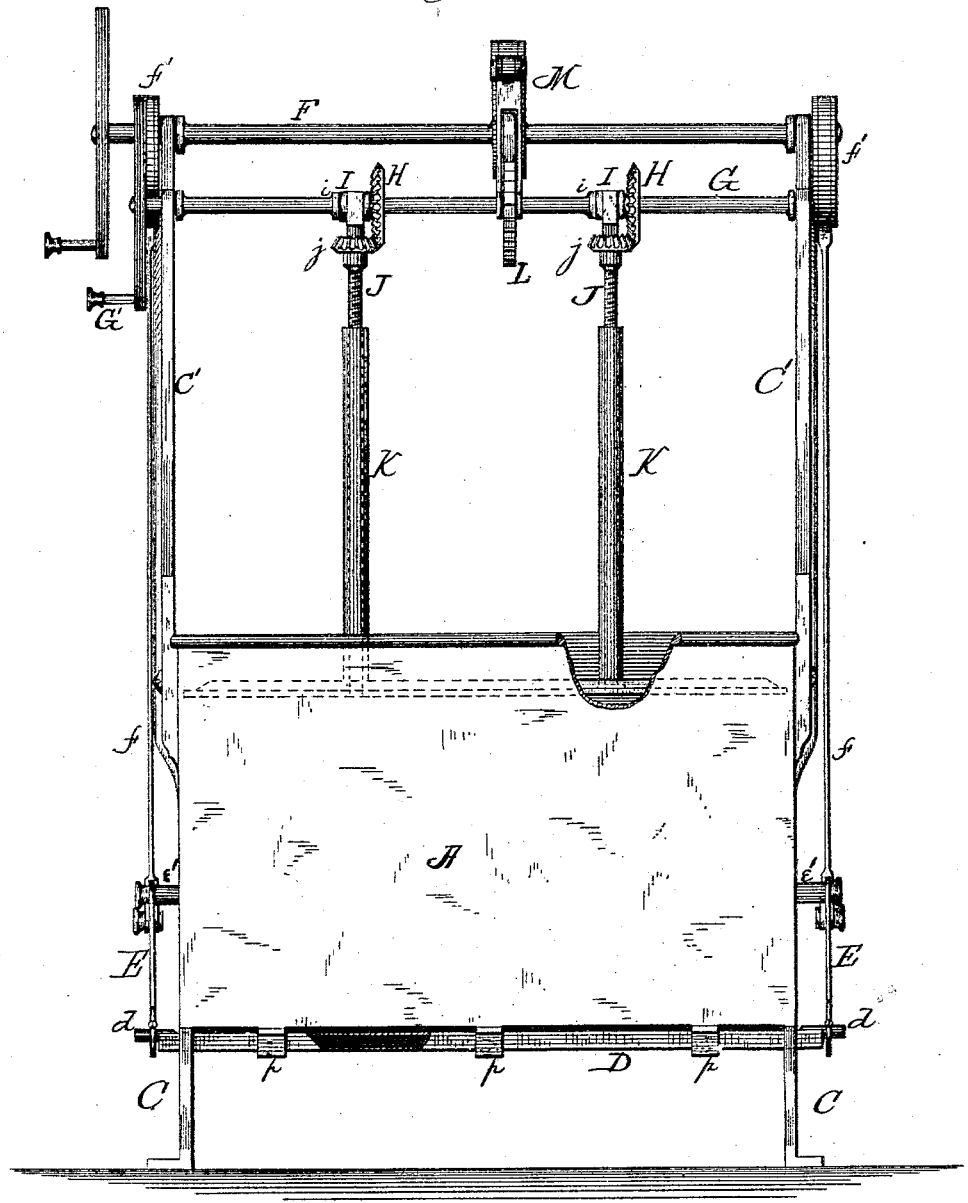
Figure 5:
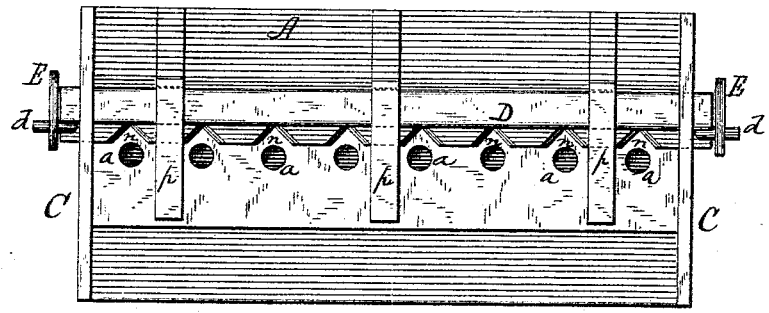
Figure 6:
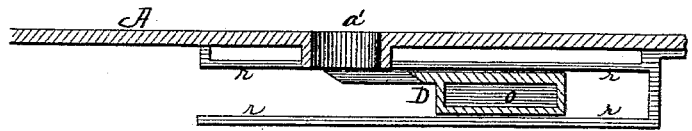
Figure 8:
Figure 7:
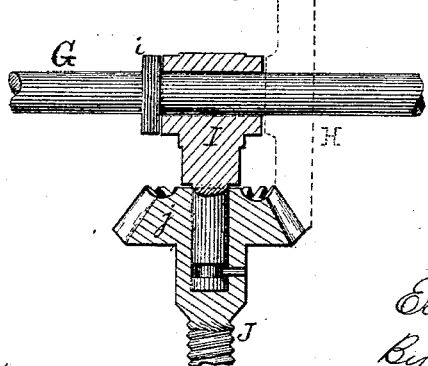

Figure 1 is a side elevation, a small portion being shown in section. Fig. 2 is an end elevation. Fig. 3 is a vertical transverse section. Fig. 4 is a transverse section of the knife. Fig. 5 is a bottom plan. Fig. 6 is a transverse section of the bottom of the "gun," with the knife and its guides. Fig. 7 is a section showing one mode of connecting the vertical screw-rods to their driving-shaft, and Fig. 8 is a detail view of a modification in which the valve and knife are made separate from each other.

Similar letters of reference in the accompanying drawings denote the same parts.

This invention is an improvement in that class of machines in which the dough is placed in a box having a perforated bottom, and is forced down through the holes by the action of a follower, and cut off into cakes by a cutter operating under the box.

The object of the invention is so to improve machines of such class as to render them capable of making soft cakes, or cakes from soft dough, as well as crackers and other cakes from harder dough; and the invention consists, first, in combining with the box or "gun," as it is technically termed, means for preventing the dough from passing through the cake-holes except at the proper time when required for forming the cakes; secondly, in combining with such means for retaining the dough in the gun an intermittent feed-motion for the follower, whereby the follower will only act on the dough when the cake-holes open; thirdly, in a heated or warm knife or cutter for cutting off the cakes or dough; and lastly, in the subordinate combinations of mechanism and elements of construction and operation, as will be hereinafter more specifically set forth.

In the drawings, A is the box or gun for containing the dough, and $a\ a\ a$ are the cake-holes in the bottom of the box, through which the dough is forced, and beneath which it is cut off into cakes, crackers, biscuits, or other similar articles. Said holes are preferably reamed out, chamfered, or beveled at their upper extremity to facilitate the passage of the dough into them, and they may be made in any form according to the form of the cake which it is desired to produce. They may be prolonged into the form of tubes $a'$, projecting downward from the bottom of the box, as shown in Fig. 6, which construction will possess certain advantages in connection with my heated cutter, as will be hereinafter described. The box or gun is provided with the usual follower B for pressing down the dough and forcing it through the holes $a\ a$ or tubes $a'$. The box is mounted on suitable supports C, whereby it will be held at the proper elevation above the carrier or apron which receives the cakes as they are cut off and conveys them away.

A carrier may be provided to act specially in connection with this machine, or the machine may be mounted on any cracker or cake machine frame that has an apron or carrier adapted to the purpose, the supports C being of such construction that they can be readily attached to such machines by clamps, screws, rivets, or otherwise.

The knife D is a wide sharp blade, so constructed and operated that as it cuts off the cakes it passes under the holes $a$ or $a'$, closes them, and holds them closed until the cakes so cut off have had time to fall upon the carrier beneath and be conveyed away, and until the knife has again been drawn back to the proper position to commence a new cut. When ready to commence a new cut, the knife leaves the holes open long enough to permit the dough to feed down through the holes or tubes, during which time the follower moves downward sufficiently to press the dough through the holes. The follower then stops, and the knife moves forward again, cutting off the cakes and closing the holes or tubes, as before.

To accomplish these movements and results, the knife is arranged directly under the holes or tubes, and its ends or projections $d$ thereon are made to extend into a slot, $e$, or between two forks of a right-angled lever, E, or other equivalent device at each end of the gun, and to have a considerable lost motion in said slots or forks of the levers or other device. The levers are pivoted to the walls of the gun at $e'$, and are operated by rods $f$ and eccentrics $f'$ from a shaft F, driven by any suitable power. As the shaft F rotates, the bell-crank levers are oscillated on their fulcra, and the knife is thereby moved backward and forward under the holes or tubes. The lost motion of the arms $d$ between the ends of the slot $e$ or forks of the levers E causes the knife to stop still at the end of its cutting-off stroke and keep the holes $a$ or tubes $a'$ closed till the cakes are conveyed away, and when it has been drawn back for a new cut, to stop still again and keep the holes or tubes open long enough to let the dough feed down through.

The intermittent feed of the plunger or follower B is accomplished in the following manner: G is a shaft, supported at a sufficient elevation by standards C, extending from the gun or its supporting-frame. H H are miter-wheels fixed upon a shaft, G. I I are two blocks hung upon the shaft G, and confined in place by collars $i$ or other suitable means. J J are two vertical screw-stems or shafts, the upper ends of which are journaled in the lower ends of the blocks I, and are secured therein by an enlarged head, a pin, collar, or other suitable means, so that, while they can rotate freely in the blocks, they cannot become detached therefrom. $j\,j$ are miter-wheels fixed upon the screw-stems, and gearing with the wheels H, so that, as the shaft G is rotated in either direction, it will put the screw-stems in rotation around their vertical axes; and K are tubular standards fixed to the upper side of the follower, and containing an internal screw-thread, to operate in connection with the screw-threads on the stems J. The rotation of the shaft G will thus screw the follower down or up, according to the direction of movement given to the shaft. Upon the shaft G, at any suitable point, is fixed a ratchet-wheel, L, operated with an intermittent motion from the driving-shaft F by means of a pawl, $l$, lever M, eccentric-rod $M^1$, and eccentric $M^2$, or the equivalents thereof. The eccentric which drives the follower is so arranged with relation to the eccentrics which drive the knife as to move the pawl forward and operate the ratchet-wheel and follower only at the moment when the knife has been retracted for a new cut and the holes $a$ or tubes $a'$ are open. The feeding of the dough down through the holes is thus arranged to take place only at the proper moment, when the holes and cutting-knife are in readiness for the operation. The extent of feed may be controlled and regulated by an adjustable connection between the lever M and eccentric-rod $M^1$, by which the throw of the pawl can be lengthened or shortened; and the extent of movement of the knife may be regulated by a similarly-adjustable connection between the bell-crank levers and their operating eccentric-rods, which connections may be effected by a pin and series of holes, or a clamping-screw, or many other devices well known to mechanics for similar purposes. The extent of lost movement of the knife may also be adjusted and regulated by any means for varying the length of the slot $e$, or the distance between the forks of the bell-crank lever, such as a screw extending through the end wall of the slot and projecting into the path of the arms $d$, or other equivalent contrivance.

The knife which I employ in connection with my machine may have a straight or curved or serrated cutting-edge, and may cut directly across the dough or obliquely, so as to have a drawing cut. As the machine here shown is organized the knife cuts directly across. When the machine is so organized the knife may be made to have a drawing cut by providing deep angular or curved notches $n$ in its cutting-edge, the open ends of which are wide enough to span the diameter of the cake holes or tubes, and the lateral edges of which are sharpened. These notches, being arranged in line with the columns of dough which they are to embrace and cut off, will have the effect to gather and confine the said column and prevent the spreading or displacement of the dough, and thereby preserve the shape of the cakes.

In cutting dough, such as is employed for making cakes and similar articles, I have discovered that a hot knife will sever the material without adhesion thereto, and the cut will be clean and perfect, whereas the material will stick to a cold instrument and be liable to destroy the form of the cakes, and frequently fail to drop upon the carrier. I therefore provide any suitable and competent means for keeping the knife sufficiently warm to make a clean smooth cut through the dough—such means, for example, being to make a portion or all of the blade hollow, as shown at $o$, and pass steam or hot air or hot water through it by any suitable flexible connecting-pipes attached to the ends or other part of the knives, or to place heated rods in or in contact with the blade in the manner commonly employed for heating fluting-irons and similar articles, or by electricity, the precise character of the means being entirely immaterial, so long as they accomplish the desired result.

The blade should be warmed sufficiently to produce the desired effect, but not sufficiently to burn or bake any part of the dough through which it passes, the proper temperature being such as will melt fatty and other sticky but liquefiable matters which adhere to the knife when cold. When the tubes $a'$ are not employed the knife may be held against the bottom of the gun and guided by bars or spring-arms $p$, extending under it, and, if desired, springing upward against it, and friction-rollers may be employed to prevent friction on either side of the knife. When the heated knife is used, however, it is recommended that the tubes $a'$ be employed, as otherwise the heat of the knife might affect the condition of the dough at the bottom of the gun. In case the tubes $a'$ are employed, the knife may be held in guides $r\ r$, as shown in Fig. 6. The follower is moved slowly downward by the operation of the machine; but it should be enabled to move quickly backward; and to this end the pawl may be disengaged from the ratchet-wheel, and the shaft G reversed by a hand-wheel, $G'$, or by a shifting-lever, fast and loose pulleys, and two belts, as will be readily understood. Provision, such as a spring-catch or other suitable detent, may be made for holding the pawl up out of engagement with the ratchet when required, and a cord or handle may be attached to the pawl to facilitate the lifting of it from the ratchet-teeth. When the pawl is thus disengaged and the shaft G reversed the follower can be quickly run up out of the gun and swung to one side out of the way.

In the machine, as hereinabove described, the knife is represented as itself constituting a kind of valve to close the apertures $a$ or $a'$ and open them at the proper time. It is evident, however, that a cutting-wire may be employed for severing the dough, and a valve may be arranged to follow after it, or operate, after it has cut the dough, to close the apertures till they should be again opened, as shown in Fig. 8. Such construction I regard as a mere equivalent of the construction herein shown.

My improved knife, heated for the purpose above described, will be as useful on any machine for cutting dough as on the machine herein described, and I do not limit its use to this machine.

The connection between the screw-rods J and blocks I may be effected by extending an arm from the blocks into the gear-wheels $j$, making a groove around said arm, and extending a pin through the wall of the wheel into the groove, the wheel being brazed or otherwise fixed to the rod J, as shown in Fig. 7.

Having thus described my invention, I claim as new—

1. The combination of the gun with a valve or slide for automatically closing the holes $a$ or tubes $a'$, and with a cutting-edge for severing the dough into cakes, substantially as described.

2. The combination of the automatic valve and cutting-edge with the gun and with a follower, B, which moves forward when the valve is retracted and cutting-edge set for a new cut, and remains stationary during the time when the cake-holes are closed and the cutting-edge is in operation, substantially as described.

3. In a dough-cutting machine, the knife D, having means for heating it connected with it, for the purposes set forth.

4. In a dough-cutting machine, the hollow knife D, for the admission of a heating material, substantially as described.

5. The stationary shaft G and its fixed uprights $C'$, in combination with the follower and the ratchet-wheel and pawl operated from the driving-shaft F by an eccentric-rod or its equivalent, substantially as described.

ERSKINE A. COLES.

Witnesses:
　M. CHURCH,
　L. HILL.